United States Patent
Hwang et al.

(10) Patent No.: US 10,114,411 B2
(45) Date of Patent: Oct. 30, 2018

(54) ELECTRONIC DEVICE AND MANUFACTURING METHOD THEREFOR

(71) Applicant: LG ELECTRONICS INC., Seoul (KR)

(72) Inventors: Junghoon Hwang, Seoul (KR); Kyoungtae Kim, Seoul (KR); Seungyong Shin, Seoul (KR); Kuangjun An, Seoul (KR); Junhyuk Choi, Seoul (KR); Jaechan Kim, Seoul (KR); Taehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/507,745

(22) PCT Filed: Mar. 20, 2015

(86) PCT No.: PCT/KR2015/002767
§ 371 (c)(1),
(2) Date: Feb. 28, 2017

(87) PCT Pub. No.: WO2016/153086
PCT Pub. Date: Sep. 29, 2016

(65) Prior Publication Data
US 2017/0285785 A1    Oct. 5, 2017

(51) Int. Cl.
*G06F 3/041* (2006.01)
*G06F 1/16* (2006.01)
(Continued)

(52) U.S. Cl.
CPC .......... *G06F 1/1618* (2013.01); *G02B 27/02* (2013.01); *G06F 3/023* (2013.01); *G06F 3/041* (2013.01); *H04L 9/32* (2013.01); *H04W 12/02* (2013.01)

(58) Field of Classification Search
None
See application file for complete search history.

(56) References Cited

U.S. PATENT DOCUMENTS

2011/0014956 A1* 1/2011 Lee ................. H04M 1/274525
                                                 455/569.1
2013/0176179 A1* 7/2013 Park ...................... H01Q 1/243
                                                    343/702
(Continued)

FOREIGN PATENT DOCUMENTS

JP      2001092561      4/2001
JP      2002007068      1/2002
(Continued)

OTHER PUBLICATIONS

PCT International Application No. PCT/KR2015/002767, International Search Report dated Dec. 15, 2015, 3 pages.

*Primary Examiner* — Patrick Moon
(74) *Attorney, Agent, or Firm* — Lee, Hong, Degerman, Kang & Waimey

(57) ABSTRACT

The present invention relates to a watch-type electronic device and a manufacturing method therefor, the electronic device comprising: a main body including a display unit; a frame provided to the main body and having an upper surface, a lower surface formed to face the upper surface, and side surfaces formed so as to cover the upper surface and the lower surface; and a touch sensor formed on the frame, wherein the upper surface comprises: a planar part formed to be parallel to the lower surface; and a curved part formed so as to be inclined toward the end of the lower surface from an end portion of the planar part, the touch sensor is formed on the curved part so as to be spaced apart from the display unit, the display unit is placed on the planar part, the frame includes a laser direct structuring (LDS) material, and the touch sensor is formed of a metal thin film.

11 Claims, 14 Drawing Sheets

(51) Int. Cl.
*G06F 3/023* (2006.01)
*H04W 12/02* (2009.01)
*H04L 9/32* (2006.01)
*G02B 27/02* (2006.01)

(56) References Cited

U.S. PATENT DOCUMENTS

| | | | | |
|---|---|---|---|---|
| 2013/0181935 A1* | 7/2013 | McKenzie | ............... | G06F 3/044 345/174 |
| 2014/0022469 A1* | 1/2014 | Lai | ........................ | G06F 3/041 349/12 |
| 2015/0130411 A1* | 5/2015 | Kim | ...................... | G04C 10/00 320/108 |
| 2015/0173675 A1* | 6/2015 | Shimizu | ................. | A61B 5/721 600/476 |
| 2015/0309533 A1* | 10/2015 | Majava | .................. | G04G 17/06 361/679.03 |
| 2015/0378487 A1* | 12/2015 | Meer | ........................ | G09G 3/20 345/207 |
| 2016/0070393 A1* | 3/2016 | Sharma | ................... | G06F 1/163 345/174 |
| 2017/0033335 A1* | 2/2017 | Kojima | ............... | H01M 2/0267 |

FOREIGN PATENT DOCUMENTS

| | | |
|---|---|---|
| JP | 2014069572 | 4/2014 |
| KR | 1020130083409 | 7/2013 |
| KR | 1020140147586 | 12/2014 |
| KR | 1020150007585 | 1/2015 |

\* cited by examiner

ELECTRONIC DEVICE AND MANUFACTURING METHOD THEREFOR

CROSS-REFERENCE TO RELATED APPLICATIONS

This application is the National Stage filing under 35 U.S.C. 371 of International Application No. PCT/KR2015/002767, filed on Mar. 20, 2015, the contents of which is hereby incorporated by reference herein in its entirety.

TECHNICAL FIELD

The present invention relates to a watch-type electric device having a small display screen, and a method for manufacturing the same.

BACKGROUND ART

Terminals may be generally classified as mobile/portable terminals or stationary terminals according to their mobility. The mobile terminals may also be classified as handheld terminals or vehicle mounted terminals according to whether or not a user can directly carry the terminal.

Electronic devices have become increasingly more functional. Examples of such functions include data and voice communications, capturing images and video via a camera, recording audio, playing music files via a speaker system, and displaying images and video on a display. Some electronic devices include additional functionality which supports game playing, while other terminals are configured as multimedia players. More recently, electronic devices have been configured to receive broadcast and multicast signals which permit viewing of content such as videos and television programs.

As the electronic device becomes multifunctional, it is implemented as a multimedia player having complicated functions such as capturing images or videos, playing music or videos, playing games, and receiving broadcastings.

Various attempts have been made to implement complicated functions in such a multimedia device by means of hardware or software.

In case of a watch-type electronic device, a screen which is displayed is small, and the screen may be blocked when a window where the screen is displayed is touched.

In order to solve such problems, a touch sensor may be formed at a position spaced from a screen which is displayed. In this case, due to a thickness of a flexible printed circuit board which connects the touch sensor with a main circuit board, an appearance design may be lowered.

DISCLOSURE OF THE INVENTION

Therefore, an object of the present invention is to provide the aforementioned problems and other problems. Another object of the present invention is to provide a watch-type electronic device having a thin touch sensor at a position spaced from a screen which is displayed.

Another object of the present invention is to provide an electronic device having an integrated design without a parting, by simplifying assembly processes when manufacturing a watch-type electronic device.

To achieve these and other advantages and in accordance with the purpose of the present invention, as embodied and broadly described herein, there is provided an electronic device, including: a body having a display unit; a frame provided at the body, and having an upper surface, a lower surface formed to face the upper surface, and side surfaces formed to cover the upper surface and the lower surface; and a touch sensor formed at the frame, wherein the upper surface includes a planar part formed in parallel to the lower surface, and a curved part inclined from an end part of the planar part towards an end of the lower surface, and wherein the touch sensor is formed at the curved part so as to be spaced from the display unit, the display unit is mounted to the planar part, and the frame includes a laser direct structuring (LDS) material, and the touch sensor is formed as a metallic thin film.

In an aspect of the present invention, a flexible printed circuit board (FPCB) connected to the touch sensor may be provided at the lower surface of the frame, the touch sensor may include a plurality of touch regions adjacent to each other, and the plurality of touch regions may be electrically connected to the flexible printed circuit board by conductive lines.

In an aspect of the present invention, the conductive lines may be formed from a point on the curved part of the frame, to a point on the lower surface of the frame.

In an aspect of the present invention, bands may be provided at both sides of the body, and the bands may be coupled to each other by a magnetic force of a magnetic member provided at each of the bands.

In an aspect of the present invention, at least one of a wireless charging coil and a light source may be formed at the band.

In an aspect of the present invention, the touch sensor may be formed to have a plurality of touch regions, and a screen displayed on the display unit may be changed by touching or dragging at least part of the plurality of touch regions.

In an aspect of the present invention, the metallic thin film may be plated by a laser.

In an aspect of the present invention, the display unit may include a display module, and a window formed to cover the display module. A window region may be formed at the front surface, and a screen may be displayed on one region of the window region by the display module, and a sensor or a indicator may be provided at a remaining region of the window region.

In an aspect of the present invention, the flexible printed circuit board may be attached to the lower surface of the frame, or may be integrally formed with the frame.

To achieve these and other advantages and in accordance with the purpose of the present invention, as embodied and broadly described herein, there is also provided a method of manufacturing an electronic device, including: manufacturing a frame by molding resin; irradiating a laser to the frame to form a pattern of a touch region to be plated, thereby applying a conductivity to the frame; applying metallic powder to the touch region by a laser, thereby performing a metal plating by a laser; forming a flexible printed circuit board at a lower surface of the frame; and positioning the frame within a metallic pattern such that the frame is covered, for an insert-molding process, wherein the resin includes a laser direct structuring (LDS) material.

In an aspect of the present invention, the LDS material may be a liquid crystal polymer (LCP).

In an aspect of the present invention, as a plurality of grooves or holes are formed at a surface of the frame, a molding material may be accommodated in the grooves or holes at the time of the insert-molding process.

In an aspect of the present invention, the touch region may be connected to the flexible printed circuit board by a plurality of conductive lines, and the flexible printed circuit board may be connected to a main circuit board of the electronic device.

In an aspect of the present invention, the flexible printed circuit board may be attached to the lower surface of the frame, and the conductive lines may be formed up to a point on the lower surface of the frame to thus be connected to the flexible printed circuit board.

In an aspect of the present invention, the flexible printed circuit board may be integrally molded with the frame in the form of a thin film, at the time of the insert-molding process.

In another aspect of the present invention, there is provided a method of manufacturing an electronic device, including: preparing a thin sheet formed of a polycarbonate (PC) material; forming a circuit forming unit at an inner side of the thin sheet; fixing a frame and components to inside of the thin sheet; integrally forming the frame, the components and the thin sheet with each other by performing an insert-molding such that appearance of the frame, the components and the thin sheet is formed; and attaching a transparent member to a surface of the insert-molded thin sheet, or molding a transparent member.

In an aspect of the present invention, at least one of a touch sensor, a wireless charging coil and a light source may be formed at the circuit forming unit.

In an aspect of the present invention, the forming a circuit forming unit may include forming magnetic members at inner two ends of the thin sheet.

In an aspect of the present invention, a color printed layer may be formed at the thin sheet, and the transparent member may be formed on the color printed layer.

In an aspect of the present invention, the transparent member may be formed of thermoplastic polyurethane (TPU).

Advantageous Effects

The electronic device and the method for controlling the same may have the following effects.

According to at least one of embodiments of the present invention, since the touch sensor is formed by performing a metal plating on the curved part of the frame by a laser, a user may apply a touch input without lowering an appearance design of the electronic device.

Further, according to at least one of embodiments of the present invention, the flexible printed circuit board may be replaced by thinly forming a molding material when forming an appearance of the frame.

Further, according to at least one of embodiments of the present invention, assembly processes may be simplified and an integrated design without a parting may be implemented, by forming a circuit at the thin sheet formed of a PC material, by fixing components, and then by forming an appearance of the electronic device by an insert-molding.

An applicable additional range of the present invention may become apparent by the following descriptions. It is obvious to those skilled in the art that various changes and modifications can be performed within the range and the scope of the present invention. Therefore, it should be understood that specific embodiments such as preferred embodiments of the present invention are merely exemplary.

MODES FOR CARRYING OUT THE PREFERRED EMBODIMENTS

Figure 1:
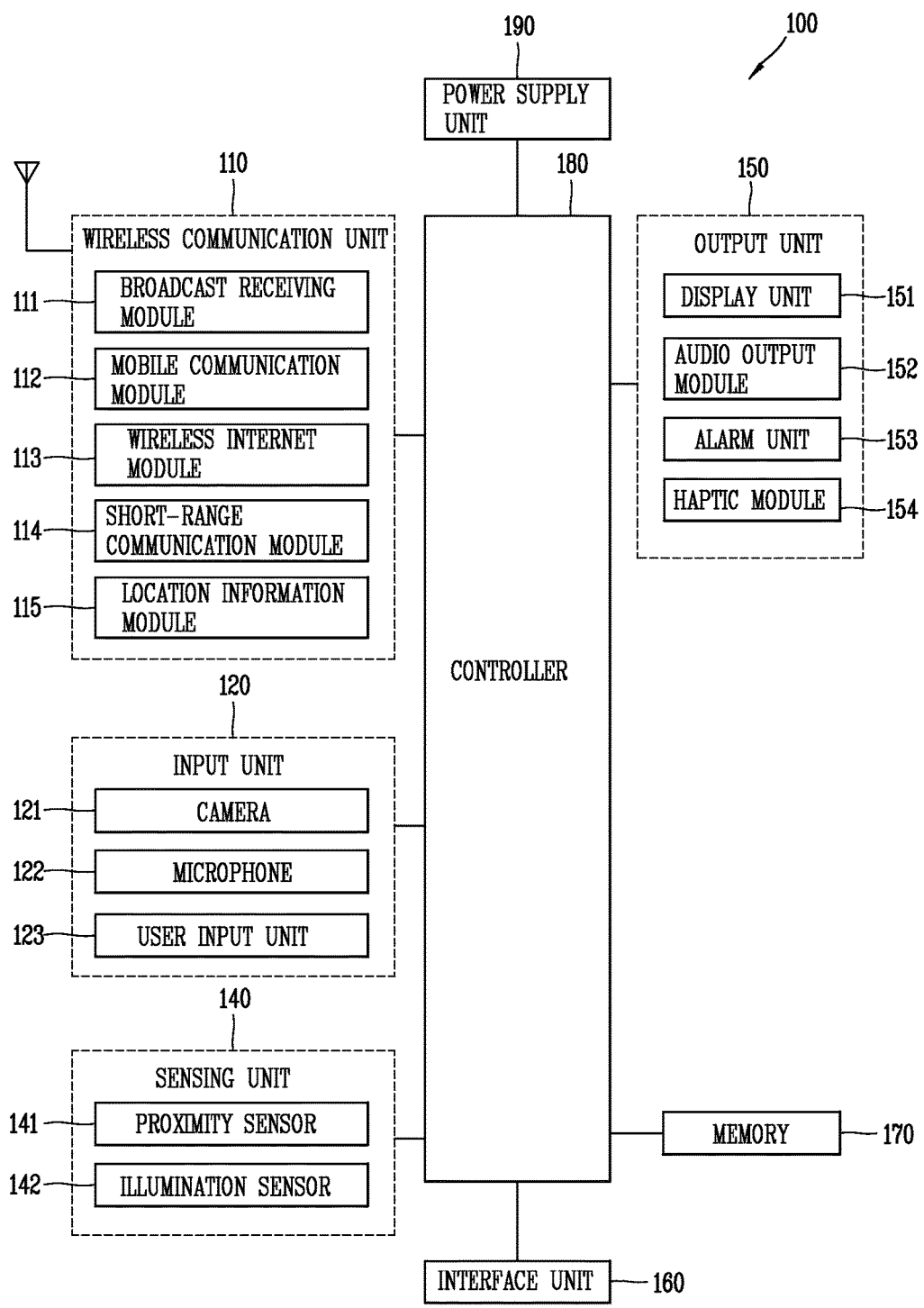
FIG. 1 is a block diagram for explaining an electronic device according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches), smart glasses, head mounted displays (HMDs), and the like.

By way of non-limiting example only, further description will be made with reference to particular types of electronic devices. However, such teachings apply equally to other types of electronic devices, such as those types noted above. In addition, these teachings may also be applied to stationary terminals such as digital TV, desktop computers, and a digital signage.

FIG. 1 is a block diagram of an electronic device according to the present invention.

The electronic device 100 is shown to have components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1 is not a requirement, and that greater or fewer components may alternatively be implemented.

More specifically, the wireless communication unit 110 typically includes one or more modules which permit communications such as wireless communications between the electronic device 100 and a wireless communication system, communications between the electronic device 100 and another electronic device, communications between the electronic device 100 and an external server. Further, the wireless communication unit 110 typically includes one or more modules which connect the electronic device 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) obtained by the input unit 120 may be analyzed and processed according to a user's control command.

The sensing unit 140 is typically implemented using one or more sensors configured to sense internal information of the electronic device, the surrounding environment of the electronic device, user information, and the like. For example, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, an alarm unit 153, and a haptic module 154. The display unit 151 may have an inter-layered structure or an integrated structure with a touch sensor in order to facilitate a touch screen. The touch screen may provide an output interface between the electronic device 100 and a user, as well as function as the user input unit 123 which provides an input interface between the electronic device 100 and the user.

The interface unit 160 serves as an interface with various types of external devices that can be coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control overall operation of the electronic device 100, in addition to the operations associated with the application programs. The controller 180 may provide or process information or functions appropriate for a user by processing signals, data, information and the like, which are input or output by the aforementioned components, or activating application programs stored in the memory 170.

In order to activate the application programs stored in the memory 170, the controller 180 may control at least part of the aforementioned components shown in FIG. 1. Further, in order to activate the application programs, the controller 180 may operate at least two of the components included in the electronic device 100, in a combined manner.

The power supply unit 190 can be configured to receive external power or provide internal power in order to supply appropriate power required for operating elements and components included in the electronic device 100. The power supply unit 190 may include a battery, and the battery may be configured to be embedded in the body, or configured to be detachable from the body.

At least some of the above components may operate in a cooperating manner, so as to implement an operation or a control method of an electronic device according to various embodiments to be explained later. The operation or the control method of the electronic device may be implemented on the electronic device by driving at least one application program stored in the memory 170.

An electronic device may be extended to a wearable device which can be worn on a human body, beyond a concept of being held by a user's hand. Such wearable devices include smart watches, smart glasses, head mounted displays (HMDs), etc. Hereinafter, examples of such an electronic device serving as a wearable device will be explained.

A wearable device may exchange data with another electronic device 100. The short-range communication module 114 may sense or recognize the wearable device, and permit communication between the wearable device and the electronic device 100. In addition, when the sensed wearable device is a device which is authenticated to communicate with the electronic device 100, the controller 180, for example, may cause transmission of data processed in the electronic device 100 to the wearable device via the short-range communication module 114. Hence, a user of the wearable device may use the data processed in the electronic device 100 on the wearable device. For example, when a call is received in the electronic device 100, the user may answer the call using the wearable device. Also, when a message is received in the electronic device 100, the user can check the received message using the wearable device.

Figure 2:
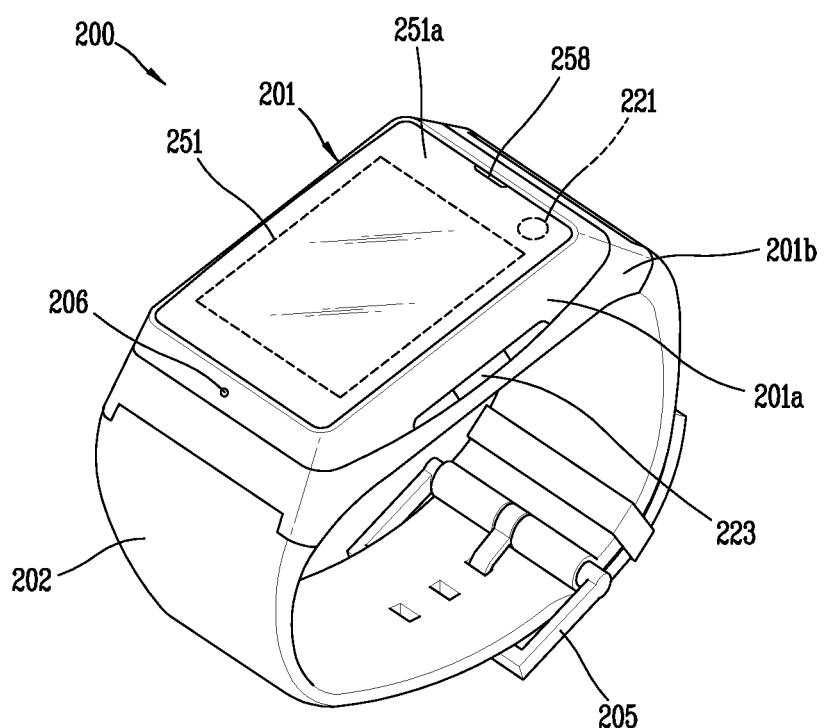
FIG. 2 is a schematic perspective view of an electronic device according to an embodiment of the present invention.

FIG. 2 is a perspective view illustrating one example of a watch-type electronic device 200 in accordance with another embodiment of the present invention.

Referring to FIG. 2, the watch-type electronic device 200 includes a main body 201 with a display unit 251 and a band 202 connected to the main body 201 to be wearable on a wrist. In general, the electronic device 200 may be configured to include features that are the same or similar to that of electronic device 100 of FIG. 1.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a electronic device 200 with a uni-body.

The watch-type electronic device 200 can perform wireless communication, and an antenna for the wireless communication may be installed in the main body 201. The antenna may extend its function using the case. For example, a case including a conductive material may be electrically connected to the antenna to extend a ground region or a radiation region.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the body together with the first case 201a.

An audio output module 258, a camera 221, a microphone 206, a user input unit 223, etc. may be provided at the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band 202 may include therein a ground extending portion (not shown) electrically connected to the antenna to extend a ground region.

The band 202 may include fastener 205. The fastener 205 may be implemented into a buckle type, a snap-fit hook structure, a Velcro® type, or the like, and include a flexible section or material. The drawing illustrates an example that the fastener 205 is implemented using a buckle.

Hereinafter, embodiments of the electronic device 200 will be explained with reference to the attached drawings. It is obvious to those skilled in the art that the present features may be embodied in several forms without departing from the spirit and essential characteristics of the present invention.

In an embodiment of the present invention, provided is an electronic device 200 capable of allowing a user to perform a touch input without blocking a screen displayed on the display unit 251, without directly touching the display unit 251 when the displayed screen is small, by arranging a touch sensor 220 at one side of the display unit 251 in a spaced manner from the display unit 251. Especially, the present invention relates to a watch-type electronic device.

Figure 3:
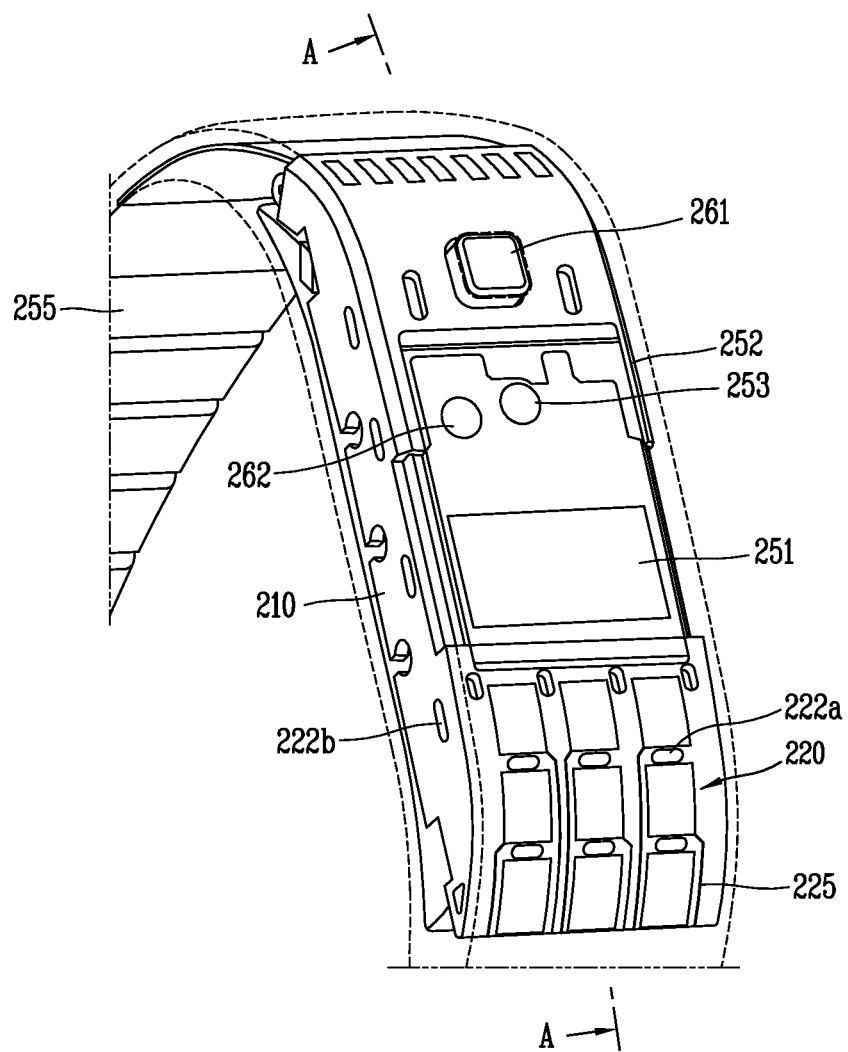
FIG. 3 is an inner perspective view illustrating part of an electronic device according to an embodiment of the present invention in a cut-out state.

FIG. 3 is an inner perspective view illustrating part of an electronic device according to an embodiment of the present invention in a cut-out state, and FIGS. 4A to 4G are views illustrating processes of manufacturing an electronic device according to an embodiment of the present invention. Hereinafter, the present invention will be explained with reference to FIG. 3 and FIGS. 4A to 4G.

The electronic device 200 device according to an embodiment of the present invention includes a body 201 (refer to FIG. 2), and a frame 210 provided at the body 201. The frame 210 may be formed of a synthetic resin or a metallic material. In an embodiment of the present invention, it is assumed that the frame 210 is formed of a synthetic resin.

The frame 210 includes an upper surface 211 on which the display unit 251 is mounted, a lower surface 212 formed to face the upper surface 211, and side surfaces 213 formed at two sides of the upper surface 211 and the lower surface 212 to cover the upper surface 211 and the lower surface 212. Here, the upper surface 211 is not formed to be flat entirely. That is, the upper surface 211 includes a planar part 211a formed in parallel to the lower surface 212 and having a flat surface; and a curved part 211b convexed from the planar part 211a towards an end of the lower surface 212, and inclined in one direction. A touch sensor 220 for a user's touch input is formed at the curved part 211b of the frame 210.

Figure 5:
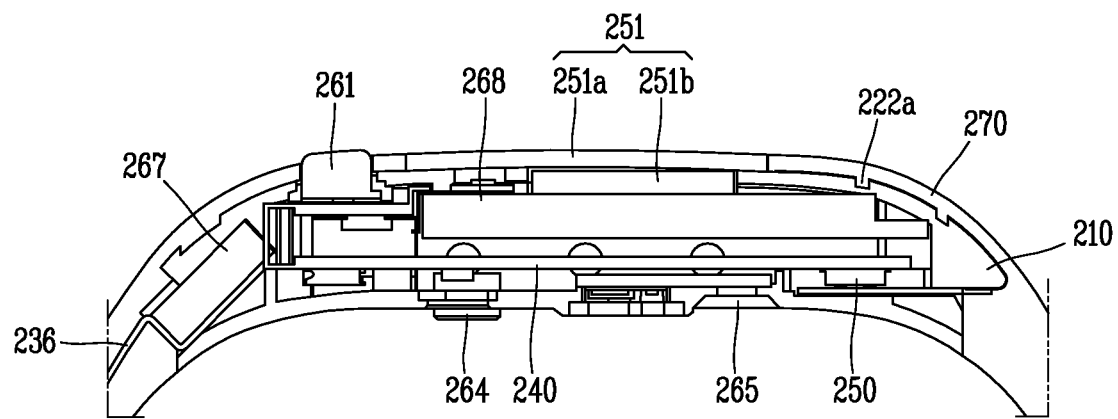
FIG. 5 is a sectional view taken along line AA in FIG. 2.
Figure 8:
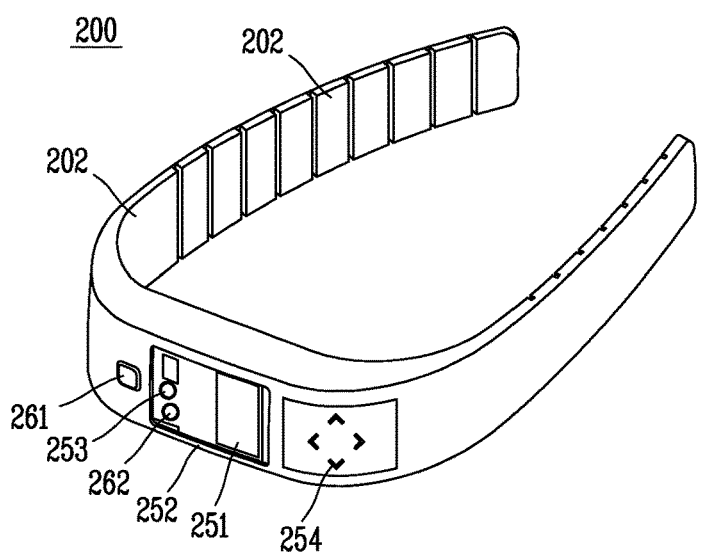
FIG. 8 is a perspective view of an electronic device according to an embodiment of the present invention, which is viewed from a front side.

FIG. 5 is a sectional view taken along line AA in FIG. 2. As shown in FIG. 5, the planar part 211a accommodates therein the display unit 251 having a window 251a and a display module 251b. Here, the window 251a is formed to be larger than the display module 251b. Not only a screen displayed by the display module 251b, but also an electrocardiogram sensor 261 and an indicator 253 may be displayed through the window 251a, as shown in FIG. 8. The indicator 253 may inform a user of a charging state. FIG. 8 is a perspective view of an electronic device according to an embodiment of the present invention, which is viewed from a front side. Referring to FIG. 8, a window region 252 includes a display region by the display unit 251, and a display region by a temperature-humidity sensor 262 or the indicator 253. The display region by the temperature-humidity sensor 262 or the indicator 253 is a region of the window region 252 excluding the display region by the display unit 251. The display region by the display module 251 means a region displayed to the outside through the window 251a by the display module 251b. The display region by the temperature-humidity sensor 262 or the indicator 253 may be referred to as a notification display region, since it informs a user of a specific state by the temperature-humidity sensor 262 or the indicator 253.

In an embodiment of the present invention, since a screen displayed by the display module 251b is displayed on the single window 251a together with the electrocardiogram sensor 261 and the indicator 253, it has a smaller size than other electronic devices.

The touch sensor 220 is formed on the curved part 211b of the frame 210, at a position not overlapped with the display unit 251. That is, the touch sensor 220 is formed at a position spaced from the display unit 251. The touch sensor 220 includes a plurality of touch regions. More specifically, as shown in FIGS. 4B and 4C, the touch sensor 220 includes a plurality of touch regions (R1 to R9), and conductive lines 225 connected to the touch regions (R1 to R9).

In the case of the watch-type electronic device, the window 251a is small and a screen displayed by the display module 251b is small. In this case, if a user directly touches the window 251a, the window 251a is not viewable in a blocked state by the user's body. Thus, the user may have a difficulty in inputting by touch. In an embodiment of the present invention, the touch sensor 220 for controlling a screen displayed on the window 251a is formed on the curved part 211b of the frame 210, not on the window 251a. Thus, the screen displayed on the window 251a is spaced apart from the touch sensor 220 for controlling the screen. Here, the display unit 251 is formed on the planar part 211a of the upper surface 211 of the frame 210.

The touch regions (R1 to R9) are electrically connected to a flexible printed circuit board (FPCB) 230, and the FPCB 230 is electrically connected to a main circuit board 240 of the electronic device 200. As shown in FIG. 5, the main circuit board 240 is provided in the electronic device 200 to input and output various signals of the electronic device 200. The FPCB 230 is connected to the conductive lines 225 (refer to FIGS. 4F and 4G) in order to control the touch sensor 220, and is formed on a rear surface of the frame 210. And the FPCB 230 is electrically connected to the main circuit board 240.

Figure 6:
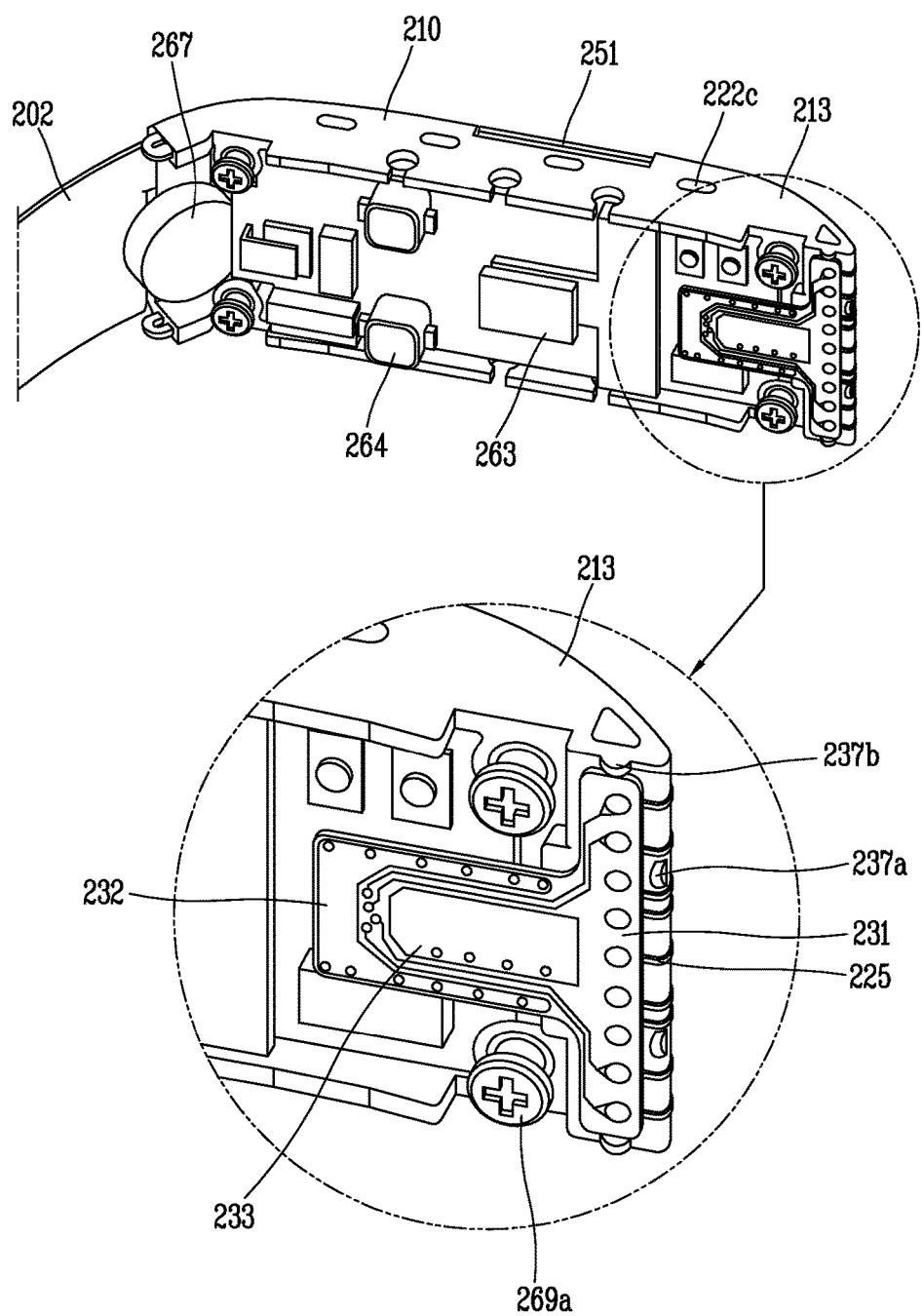
FIG. 6 is a perspective view and a partial enlargement view of an electronic device according to an embodiment of the present invention, which are viewed from a lower side.

In an embodiment of the present invention, information having various functions is displayed in a simple form, through the window 251a. For instance, as shown in FIGS. 5 and 6, the electronic device 200 is provided with sensors related to a health care, such as an electrocardiogram sensor 261, a heartbeat sensor 263, and a body temperature sensor 264. It is enough to display results by these sensors. For example, while a user is exercising, an ECG graph by the electrocardiogram sensor 261, a heart rate by the heartbeat sensor 263, a body temperature by the body temperature sensor 264, and the like may be displayed. Furthermore, as shown in FIG. 8, the temperature-humidity sensor 262 may be disposed on a front surface of the electronic device 200. And a temperature and a humidity of the air may be measured by the temperature-humidity sensor 262.

In an embodiment of the present invention, a screen is displayed in the form of a small point, by the display unit 251 (more specifically, the display module 251b) through the window 251a, which is different from a display manner on the electronic device 200 having a relatively large screen such as a mobile phone or a tablet.

In the electronic device 200 according to an embodiment of the present invention, since it is possible to play music or moving images, a touch input is required.

To this end, in an embodiment of the present invention, the touch sensor 220 may be formed to have nine regions. The regions may be used as a direction key 254 by a touch input method, or may be used to display a specific list in a next or previous state by a drag or scroll method.

Figure 10:
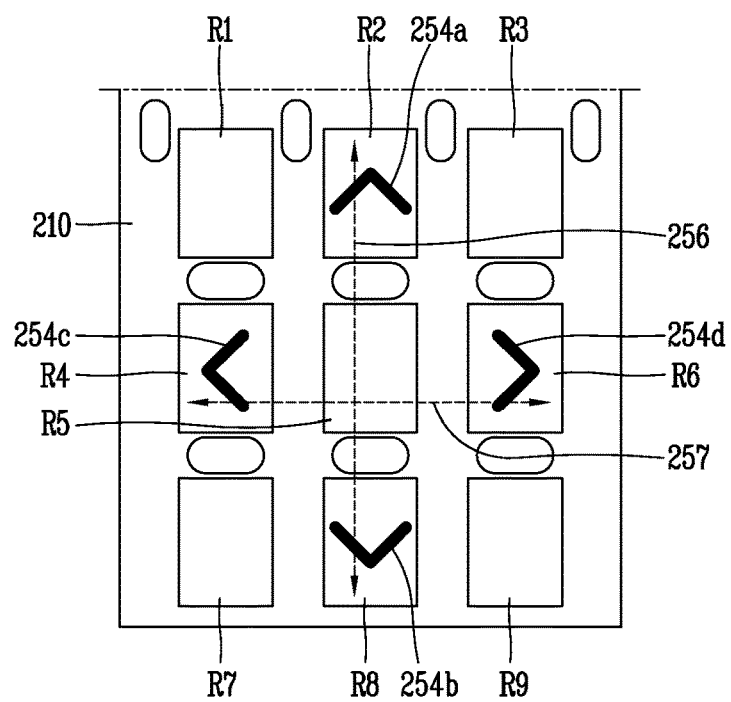
FIG. 10 is a view for explaining a usage method of a touch pattern according to an embodiment of the present invention.

FIG. 10 is a view for explaining a usage method of a touch pattern according to an embodiment of the present invention. Referring to FIG. 10, when some of the plurality of regions R1 to R9 are dragged from the left to the right, a screen displayed on the display unit 251 may be switched to a next screen according to a touch order. In FIG. 10, when a user performs a touch input in directions of arrows 256 and 257 indicated by dotted lines, the displayed screen is converted according to a touch direction. If a user touches the screen in order of R4, R5 and R6 in a direction of the arrow 257, the screen may be switched to a next screen.

On the contrary, if some of the plurality of regions R1 to R9 are dragged from the right to the left to be touched in a direction of the arrow 257, the screen displayed on the display unit 251 may be converted into a previous screen according to a touch order. For example, if a touch input is applied in order of R3, R2, and R1, the screen may be switched to a previous screen. If a touch input is applied in order of R2, R5, and R8, the screen is scrolled downward. When a touch input is applied in order of R8, R5, and R2, the screen is scrolled up. The scrolled screen may include a screen converted to a previous or next screen.

As described above, by touching regions adjacent to each other among the regions R1 to R9 in order, it is possible to switch a displayed screen in up, down, left, and right directions, or to scroll the displayed screen in up, down, left, and right directions. That is, the screen may be moved in up, down, left, and right directions, or may be converted into a previous or next screen, by a drag input.

Also, the screen may be moved upward, downward, left, or right, or may be converted into a previous or next screen, by touching up, down, left, and right direction keys 254a, 254b, 254c, and 254d.

As described above, in an embodiment of the present invention, the screen may be scrolled in up, down, left, and right directions (256, 257) or may be switched, by touching the up, down, left, and right direction keys 254a, 254b, 254c, and 254d, or by touching the touch regions R1 to R9 in any order.

Further, in case of playing multimedia such as music or moving images, the up, down, left and right direction keys 254 may be operated. For example, when a list of music to be reproduced is displayed on the display unit 251, music to be reproduced is displayed by pressing the up and down direction keys 254a and 254b or the left and right direction keys 254c and 254d. Then, if a user wishes to select the music, the music is played by touching the middle region R5.

In an embodiment of the present invention, a touch region in the form of a metal thin film is formed on the curved part 211b of the frame 210, and the conductive lines 225 which connect the plurality of touch regions R1 to R9 are electrically connected to the FPCB 230. Here, the plurality of touch regions form a constant touch pattern.

In the conventional art, since the flexible printed circuit board 230 is formed on the curved part 211b of the frame 210, a thickness of the electronic device 200 seen from the outside is increased by a thickness of the flexible printed circuit board 230. Further, while a molding process is being performed on the flexible printed circuit board 230, the flexible printed circuit board 230 may be pushed or separated so that a lead-bonded portion may be separated to disconnect a circuit. In an embodiment of the present invention, a conductive pattern having a very thin thickness may be formed by using a laser to solve such a problem.

Conventionally, a thickness of the electronic device 200 is increased as a thickness of an adhesive (250 μm) is added to a thickness of the flexible printed circuit board 230 (50 μm~100 μm). In order to prevent such a thickness increase, it is possible to use a method of reducing a thickness of an apparatus. If a thickness of an apparatus is reduced, intensity is deteriorated. In an embodiment of the present invention, since a metal plating is performed by using a thin film irradiated with a laser, a touch region (pattern) may be sufficiently realized with a thickness of about 10 μm. This may allow a touch input without deteriorating an appearance design.

In an embodiment of the present invention, the frame 210 is plated with a metallic material by a laser irradiated thereon. To this end, the frame 210 should have a mechanical strength high enough to withstand laser irradiation, and should be formed of a material which can withstand a high temperature. In an embodiment of the present invention, the frame 210 is molded by using a Laser Direct Structuring (LDS) material. In other words, the frame 210 is molded by using an LDS material, or by adding an LDS material. Here, the LDS may be formed of a liquid crystal polymer (LCP), which is merely an example. The LDS may be formed of any material having an excellent heat resistance and a high strength against a high temperature.

The LDS according to an embodiment of the present invention means a laser direct patterning method which can form a conductive pattern by using an electroless plating after directly patterning a circuit on a plastic molded product. The LDS may have an advantage that a circuit of various 3D shapes may be implemented by directly patterning the circuit on a plastic product by using a laser, and an advantage that the conventional PCB, etc. may be omitted.

During the LDS process, a metal organic compound contained in the frame 210 is formed as a plating seed by a laser reaction. That is, energy of a laser decomposes a chemical coupling of the metal organic compound of the frame 210 by a photochemical reaction, and a metallic element is formed only in a laser-patterned portion to thus serve as a plating seed at the time of an electroless plating. In addition, the surface of the frame 210 which has undergone a laser ablation process has a strong mechanical coupling between a plating layer and the frame 210. This may replace the conventional etching process required at the time of a polymer electroless plating.

As the process order of the LDS, resin to which a metal organic compound has been added is molded, and then a desired circuit board is activated by irradiating a laser onto the surface of a product. Then, a conductive pattern is formed by an electroless plating, etc.

Hereinafter, will be explained a method of manufacturing an electronic device according to an embodiment of the present invention with reference to FIGS. 4A to 4G and FIGS. 11 and 12.

Figure 11:
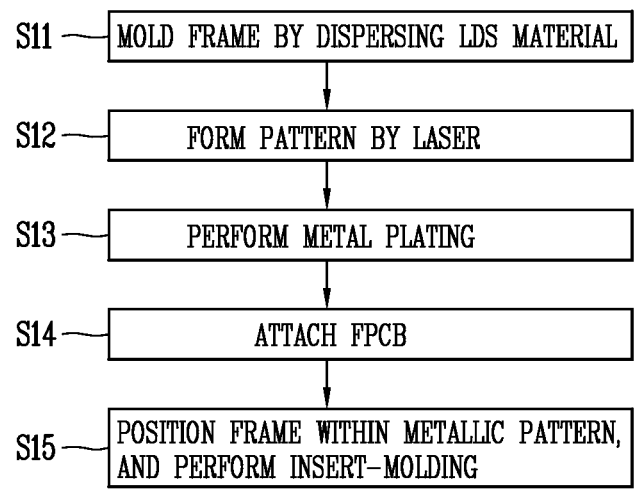
FIGS. 11 to 13 are flowcharts illustrating processes of manufacturing an electronic device according to an embodiment of the present invention.
Figure 12:
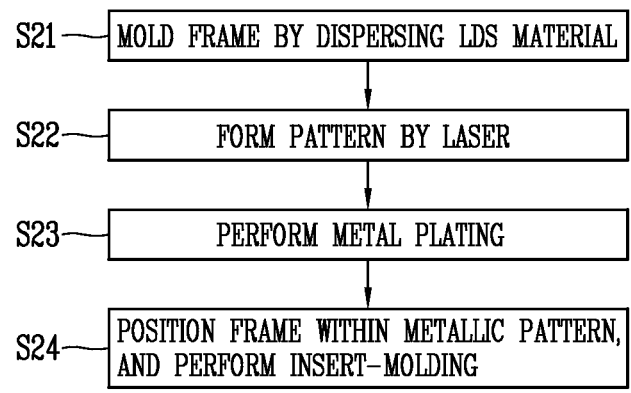
Figure 13:
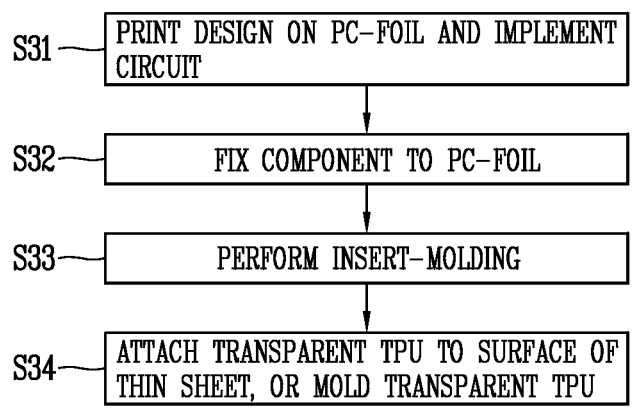

FIGS. 4A to 4G are views illustrating processes of manufacturing the electronic device 200 according to an embodiment of the present invention, and FIGS. 11 to 13 are flowcharts illustrating processes of manufacturing the electronic device 200 according to an embodiment of the present invention.

For the electronic device 200 according to an embodiment of the present invention, the frame 210 is molded by using a Laser Direct Structuring (LDS) material (S11, S21). The frame 210 may be formed of an LDS material. Alternatively, the frame 210 may be molded by dispersing an LDS material. That is, the frame 210 may be formed by using only an LDS material, or may be formed by combining another resin such as PC with an LDS material. That is, the frame 210 according to an embodiment of the present invention may be sufficiently formed if it contains an LDS material.

Considering the cost; it is preferable to form the frame 210 by mixing or dispersing an LDS material with or in a polycarbonate (PC) resin. That is, as shown in FIGS. 4A to 4E, the frame 210 is formed by molding. A plurality of grooves 222a, 222b and 222c are formed on a front surface 211, a lower surface 212 and side surfaces 213 of the frame 210. Alternatively, similar to the curved part 211b, a through hole 222d may be formed. The through hole 222d communicates with the lower surface 212 to form a columnar shape when a molding material is inserted thereinto.

The reason why the plurality of grooves 222a, 222b and 222c are formed is in order to insert a molding material into the groove 222 and to fix the molding material to the frame 210 so as to cover the frame 210 in a subsequent process. However, it is not always necessary to form the through hole 222d, but a molding material may be fixed to the frame 210 only by the plurality of grooves 222a, 222b, and 222c.

After the frame 210 is molded, a predetermined pattern is formed by irradiating the frame 210 with a laser (S12, S22) as shown in FIG. 4B. This is to apply conductivity to pattern regions R1 to R9 to be plated. By irradiating the frame 210 with a laser, a metal plating is performed only on a laser-patterned portion when performing the metal plating later. That is, as described above, when the frame 210 is ablated by a laser, the surface of the frame 210 has a strong mechanical coupling between a plating layer and the frame 210.

In this case, a plurality of regions (R1~R9) are formed through a laser patterning. In an embodiment of the present invention, nine regions are formed. A plurality of grooves 222a are formed among the plurality of regions.

Then, as shown in FIG. 4C, metal powder is dispersed in the plurality of regions patterned by a laser, and is irradiated with a laser to form a conductive pattern by printing. That is, metallization is performed (S13, S23). This may allow a resistance to be lowered, and a stability to be obtained. Conductive lines 225 are formed at the plurality of touch regions (R1~R9), and the conductive lines 225 are connected to the flexible printed circuit board 230 provided on the lower surface 212 of the frame 210.

That is, after the metallization by a laser, flexible printed circuit boards 230 and 230' are formed on the lower surface 212 of the frame 210, as shown in FIGS. 4D to 4G. The touch regions are connected to the flexible printed circuit boards 230 and 230' by the plurality of conductive lines 225, and the flexible printed circuit boards 230 and 230' are connected to the main circuit board 240 of the electronic device 200. The flexible printed circuit boards 230 and 230' are attached to the lower surface 212 of the frame 210, and the conductive lines 225 are formed up to a point on the lower surface 212 of the frame 210 to thus be connected to the flexible printed circuit board 230.

The flexible printed circuit board 230 according to an embodiment of the present invention may be formed by two methods.

Figure 4A:
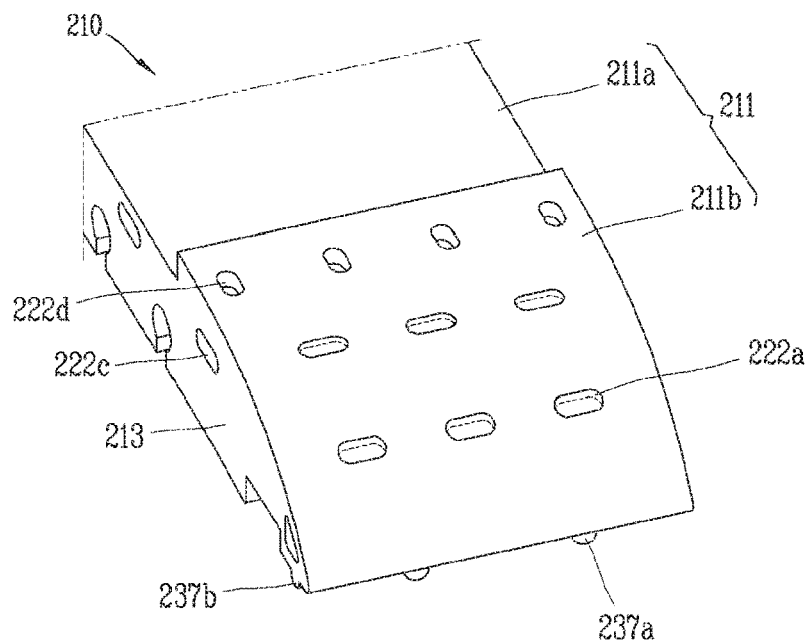
FIGS. 4A to 4G are views illustrating processes of manufacturing an electronic device according to an embodiment of the present invention.
Figure 4B:
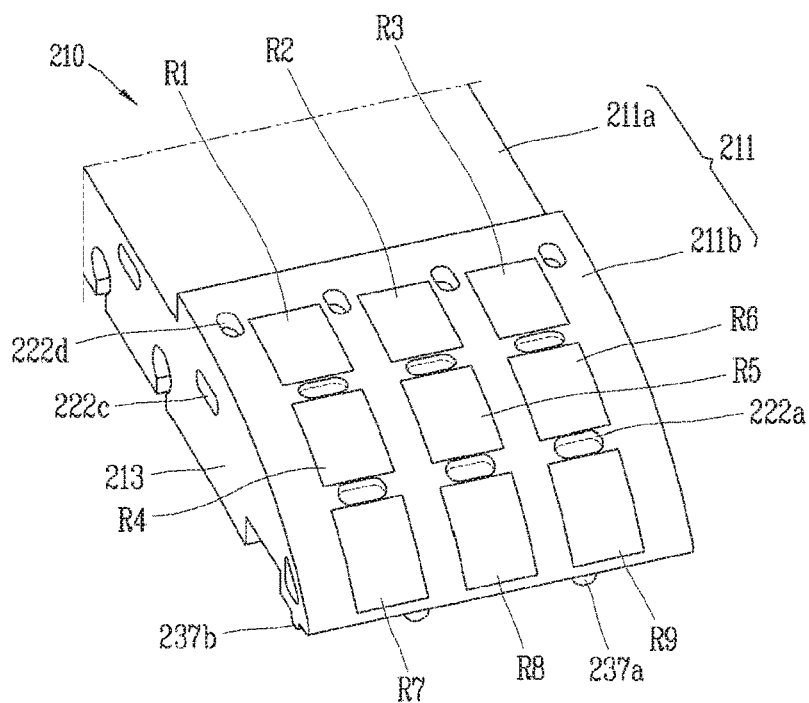
Figure 4C:
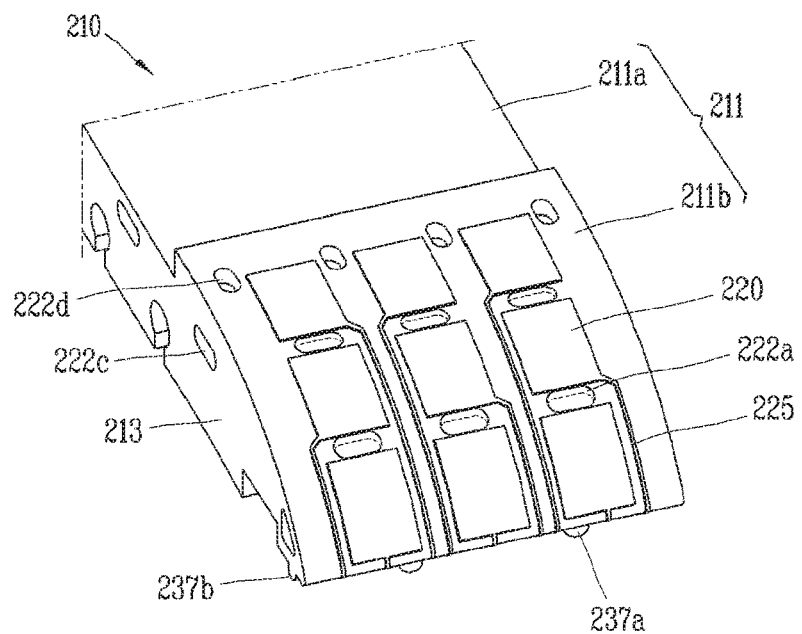

As shown in FIGS. 4A to 4C, after a touch pattern is formed on the frame 210, the flexible printed circuit board 230 is formed. The flexible printed circuit board 230 according to an embodiment of the present invention may be attached to the lower surface 212 of the frame 210 by bonding (S14) as shown in FIG. 4D, or may be integrated with a molding material on the frame 210 by being thinly molded at the time of a molding process as shown in FIG. 4E.

Figure 4D:
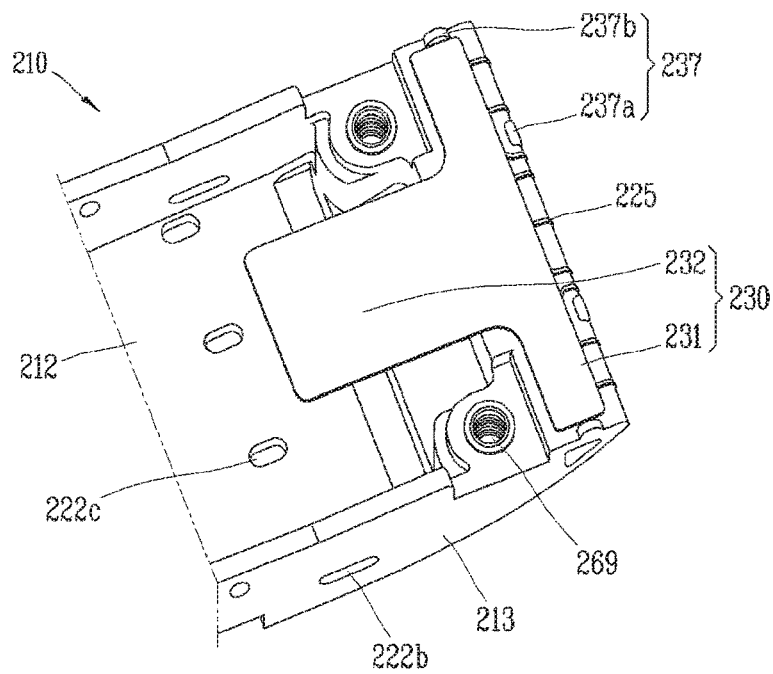
Figure 4E:
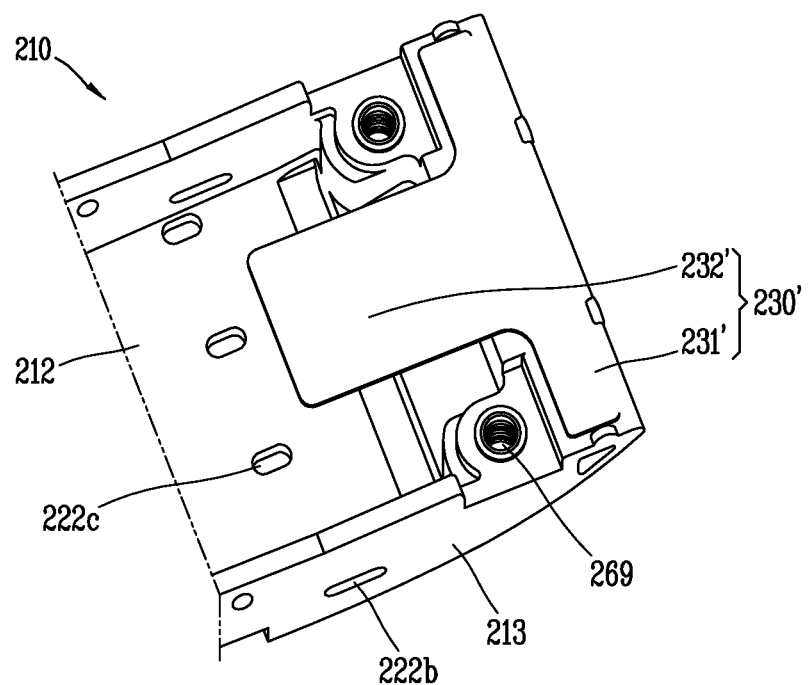
Figure 4F:
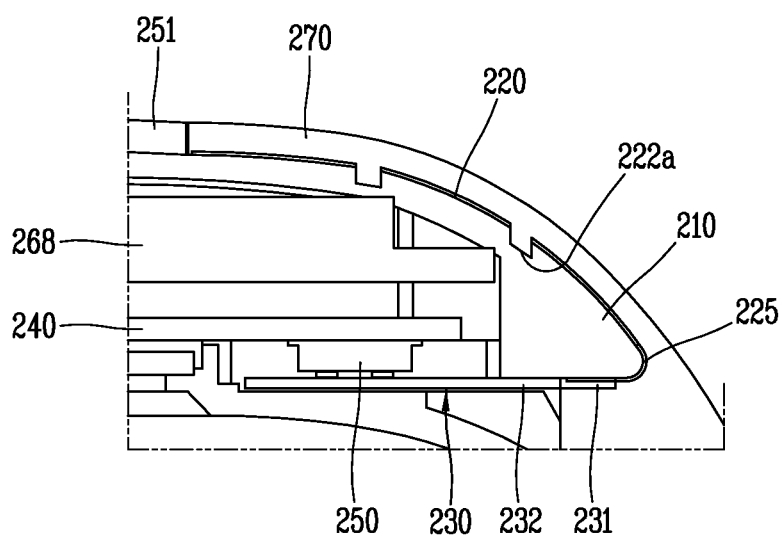
Figure 4G:
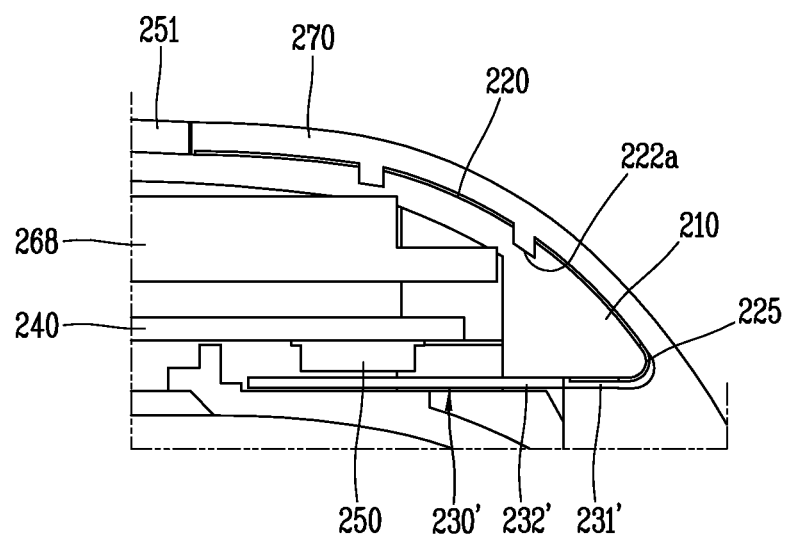

FIGS. 4F and 4G are partial sectional views of the electronic device 200 manufactured by FIGS. 4D and 4E.

In case of the former (refer to FIGS. 4D and 4G), the flexible printed circuit board 230 may be disposed on the lower surface 212 of the frame 210, and then may be attached to the lower surface by soldering or by an adhesive, etc. (S14). In this case, the flexible printed circuit board 230 has a width corresponding to a width of the frame 210. And the flexible printed circuit board 230 includes a first part 231 where the conductive lines 225 are formed on a rear surface of the frame 210 in an extending manner, and a second part 232 extending from the first part 231 and having a smaller width than the first part 231. As shown in FIG. 6, a conductive line collecting portion 233 is formed at the second part 232.

In case of the latter (refer to FIGS. 4E and 4G), the flexible printed circuit board 230' may have a first part 231' and a second part 232' as shown in FIG. 4G, such that a thin molding material may have the same shape as the former electronic flexible printed circuit board 230. Furthermore, since the thin molding material in FIG. 4G is flexible, it may serve as the flexible printed circuit board 230.

The conductive lines 225 are densely arranged in the second parts 232 and 232', and the second parts 232 and 232' may be flexible. As shown in FIGS. 4F and 4G, the second parts 232 and 232' are electrically connected to the main circuit board 240 by a connector 250.

Referring to FIGS. 4F and 4G, a plurality of grooves 222a are formed on the surface of the frame 210, and the touch sensor 220 formed by the conductive pattern (touch regions R1~R9) is disposed at a region except for the grooves 222a. The touch regions (R1~R9) are formed up to a lower end of the frame 210.

In FIG. 4G, it may be understood that the flexible printed circuit board 230 is omitted. But a molding material 230' which forms the appearance of the electronic device 200 serves as the flexible printed circuit board 230. That is, in the latter case, the flexible printed circuit board 230' is integrally formed with the frame 210.

In the latter case, it is the same to form the conductive touch regions (R1 to R9) at the frame 210 by a laser, and the plurality of touch regions are connected to the flexible printed circuit board 230' by the conductive lines 225. However, the flexible printed circuit board 230' is different from the former flexible printed circuit board 230 in that the flexible printed circuit board 230' is integrally formed with the frame 210 without being additionally attached to the frame 210. That is, the flexible printed circuit board 230" is formed to have the same shape as the flexible printed circuit board 230 of FIG. 4D. As shown in FIG. 4F, the latter flexible printed circuit board 230' is also formed to include a first part 231' having a width corresponding to a width of the frame 210, and a second part 232' extending from the first part 231' and having a smaller width than the frame 210.

Since the flexible printed circuit board 230' is thinly molded when the frame 210 is molded, it may serve as the flexible printed circuit board 230.

Meanwhile, guides 237, 237a and 237b are formed at an end of the frame 210, more specifically, at a region connected to the band 202. The guide 237 functions to define a region for forming the flexible printed circuit board 230. That is, the flexible printed circuit board 230 is formed at an inner region of the guide 237. More specifically, first guides 237a are formed on both sides of a lower end of the frame 210, and second guides 237b are formed on both sides of the lower surface 212 of the frame 210. Furthermore, the guides 237a and 237b are protruded toward a lower part of the frame 210 so that they may be more easily fixed to a case 270, a molding material.

Finally, the frame 210 is placed in a metallic pattern to undergo an insert-molding (S15, S24). Here, a molding material may be a thermoplastic polyurethane (TPU) material. As shown in FIGS. 4E and 4G, the TPU material is molded so as to enclose the frame 210. In this case, the LDS material may be a liquid crystal polymer (LCP), but is not limited thereto.

So far, explanations have been conducted with reference to FIGS. 4A to 4G. FIGS. 4A to 4C correspond to both of the former and latter methods, FIGS. 4D and 4F correspond to the former method, and FIGS. 4E and 4G correspond to the latter method.

Figure 7:
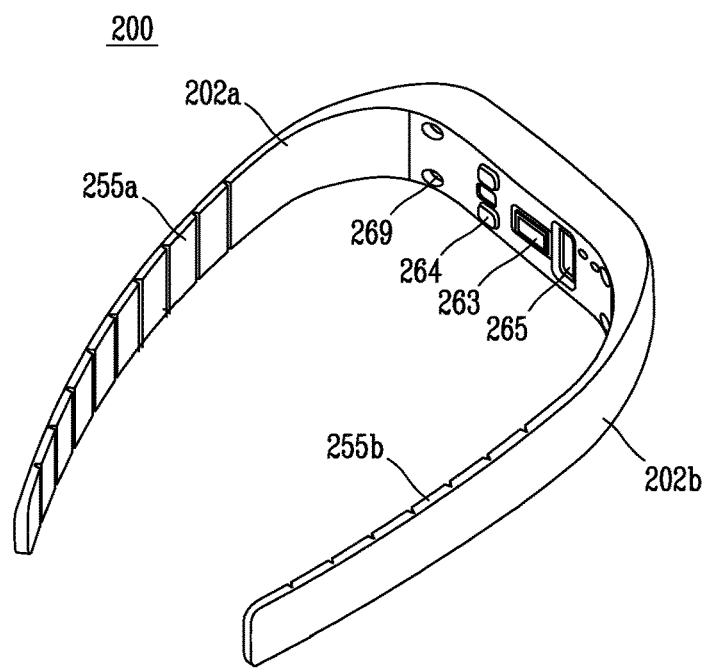
FIG. 7 is a perspective view of an electronic device according to an embodiment of the present invention, which is viewed from a rear side.

As shown in FIGS. 5 to 7, the electronic device 200 according to an embodiment of the present invention may include a plurality of sensors. For example, an electrocardiogram sensor 261 may be provided on the front surface of the frame 210, and a heart rate sensor 263 may be provided on the lower surface 212 of the frame 210. A vibration motor 267 may be provided at the end of the frame 210 to perform a notification function, and the frame 210 and the body 201 may be coupled to each other by a screw 269a. For this, a screw hole 269 is formed at a rear surface of the body 201, and the frame 210 and the body 201 are coupled to each other by using the screw 269a.

In the frame 210, the main circuit board 240 is provided, and a battery 268, a power supply unit for operating the main printed circuit board and other components are disposed.

A sub circuit board 236 may be provided at the band 202, and a wireless charging coil 281' (see FIG. 9A) or a light source (LED) may be formed at the sub circuit board 236. For this, the sub circuit board 236 is electrically connected to the main circuit board 240.

A charging terminal 265 may be provided on the lower surface of the frame 210 and connected to a charger (not shown). A charging state of the electronic device 200 may be displayed on the indicator 253 formed on the front surface of the frame 210. For example, green light may be displayed when a charging operation is completed, and red light may be displayed when a charging operation is being executed.

A sensor 264 for sensing a body temperature may be provided on the lower surface of the frame 210, and a sensor 262 for sensing an air temperature may be provided on the upper surface 211 of the frame 210.

In addition, a plurality of magnetic members 255 may be formed at a region corresponding to the band 202 of the electronic device 200. If the band 202 is divided into first and second bands 202a and 202b, first and second magnetic members 255a and 255b are provided at the first and second bands 202a and 202b, respectively.

The band 202 is formed of a thin film of a polycarbonate (PC) material and has a flexible property. Here, the magnetic members 255a and 255b may be attached to the band 202 by an adhesive or the like, and are formed to have different magnetic poles at both ends of the band 202. A magnetic member 255 may be formed at one side of the band 202, and a metal member may be formed at another side of the band member 202 so as to be coupled to the magnetic member 255 by a magnetic force.

Both ends of the band 202 are separated from each other. In order to wear the electronic device 200 on a user's wrist, a coupling member such as the fastener 205 (see FIG. 2) may be used at the band 202. However, in an embodiment of the present invention, the magnetic member 255 is used.

Hereinafter, a method of manufacturing an electronic device 200 according to another embodiment will be described with reference to FIGS. 9A to 9E and FIG. 13.

FIGS. 9A to 9E are views illustrating processes of manufacturing an electronic device according to an embodiment of the present invention, and FIG. 13 is a flowchart illustrating processes of manufacturing an electronic device according to an embodiment of the present invention.

Figure 9A:
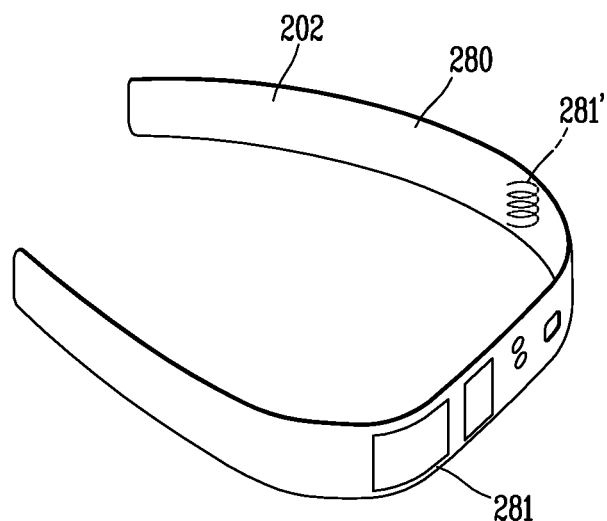
FIGS. 9A to 9E are views illustrating processes of manufacturing an electronic device according to an embodiment of the present invention.

In FIGS. 9A to 9E and 13, a polycarbonate foil is used. First, as shown in FIG. 9A, a thin sheet 280 made of a PC material is prepared. The thin sheet 280 made of a PC material may be easily bent due to its softness. That is, the thin sheet 280 in FIG. 9A is formed into a round shape in consideration of an appearance design, but has a property of being easily bent. Since the thin sheet 280 is easily bent as described above, it may replace the band 202. That is, a three-dimensional pattern, a concavo-convex portion, or the like may be formed on an outer side surface of the thin sheet 280 to realize a design having a texture.

Figure 9B:
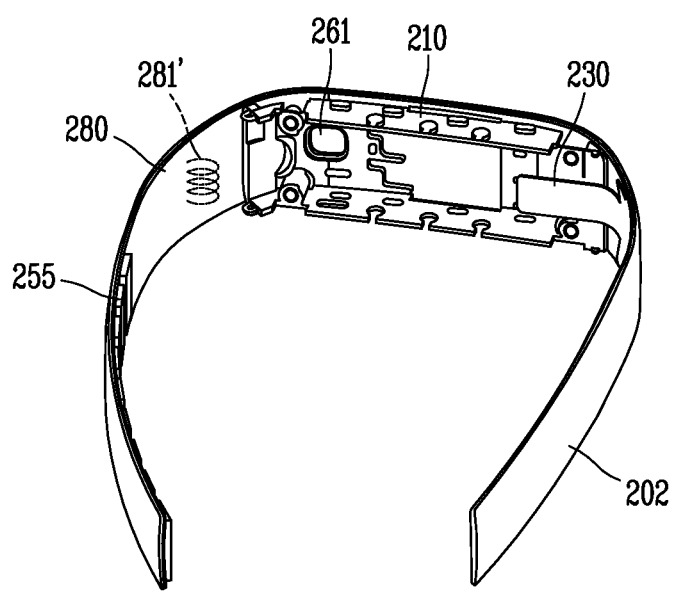

As described above, a plurality of components should be mounted on the thin sheet 280 which can be elastically transformed, and a circuit region should be formed for this (S31). That is, as shown in FIG. 9A, a circuit forming unit 281 is formed on an inner surface or an outer surface of the thin sheet 280, and various components are mounted to the circuit forming unit 281 (S32). For example, the circuit forming unit 281 may be a touch sensor forming unit which can implement a touch input, a light source forming unit, or a wireless charging coil unit. If the circuit forming unit 281 is a light source forming unit, a light source such as an LED may be formed. If the circuit forming unit 281 is a wireless charging coil unit, a wireless charger coil may be formed so that the electronic device 200 may be charged wirelessly. FIGS. 9A and 9B show that a wireless charging coil 281' is formed at the band 202.

Then, as shown in FIG. 9B, components are fixed to the thin sheet 280 (S32), and the components include the frame 210 and the flexible printed circuit board 230. As the components are provided at the thin sheet 280, the electronic device 200 may have an enhanced strength.

The components may include the main circuit board 240, the battery 268, etc., as well as the frame 210 and the flexible printed circuit board 230. The main circuit board 240, the battery 268, etc. may be provided at the frame 210. The circuit forming unit 281 may be electrically connected to the flexible printed circuit board 230.

Further, the thin sheet 280 includes a part which performs a function of the band 202. As shown in FIG. 9B, a plurality of magnetic members 255 may be formed at a region corresponding to the band 202.

The thin sheet 280 is a thin film made of a polycarbonate (PC) material, and has a flexible property. Therefore, an inner region of the thin sheet 280 where components such as the frame 210 are not fixed is easily bent, and such a bendable region may be used as the band 202.

Here, the magnetic member 255 may be attached to the band 202 by using an adhesive or the like, and may be formed to have different magnetic poles at both ends of the band 202. The magnetic member 255 may be formed at one side of the band 202, and a metallic member may be formed at another side of the band 202 so as to be coupled to the magnetic member 255 by a magnetic force.

The thin sheet 280 is integrally formed with the band 202, but both ends of the band 202 are separated from each other. In order to wear the electronic device 200 on a user's wrist, a coupling member such as the fastener 205 (see FIG. 2) may be used at the band 202. However, in an embodiment of the present invention, the magnetic member 255 is used.

Figure 9C:
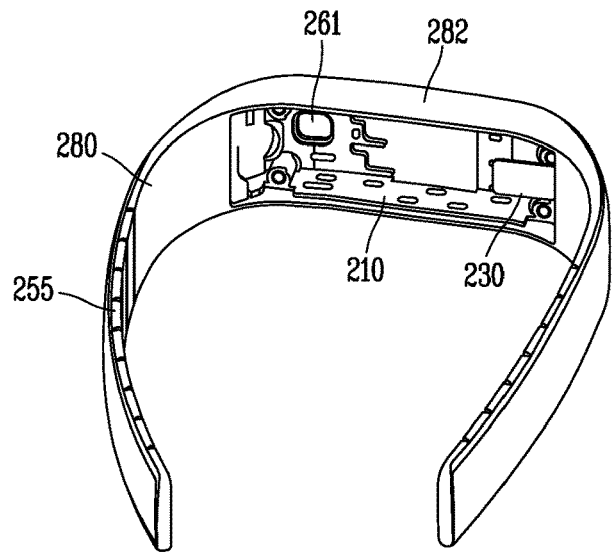

Then, as shown in FIG. 9C, resin is insert-molded on an outer surface of the thin sheet 280 (S33). Here, the insert-molding may be performed by using a TPU material.

Figure 9D:
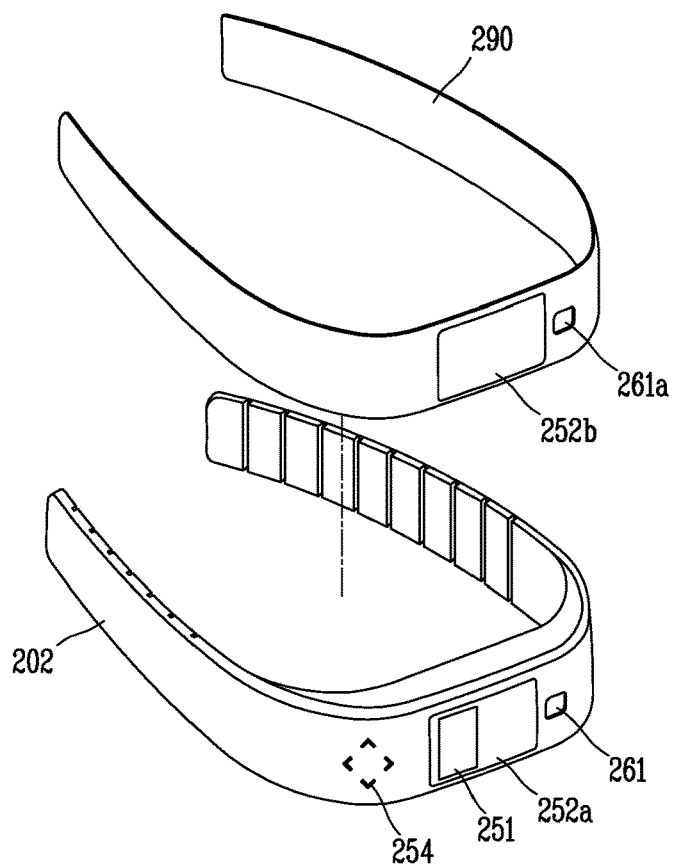
Figure 9E:
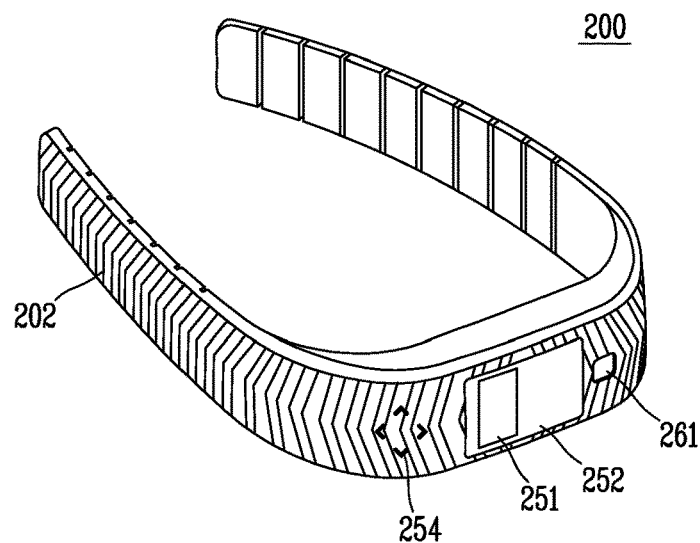

After forming the appearance of the electronic device 200 by the insert-molding, as shown in FIG. 9D, a transparent member 290 may be attached to a surface of the insert-molded thin sheet 280, or the transparent member 290 may be molded (S34). That is, in FIG. 9D, the transparent member 290 (TPU) is attached to the thin sheet 280 in a state where the thin sheet 280 has been insert-molded.

Window formation regions 252a and 252b are formed at the thin sheet 280 and the transparent member 290, respectively, thereby forming a window region 252.

The window forming regions 252a and 252b may be formed of a transparent glass. The thin sheet 280 may further include a direction key 254 and a sensor 261. A hole 261a corresponding to the sensor 261 is formed at the transparent member 290, such that the sensor 261 is exposed to the outside. The sensor 261 may be an electrocardiogram sensor. However, the present invention is not limited to this. That is, the sensor 261 may be one of sensors for healthcare.

In an embodiment of the present invention, a circuit is formed at an inner side of the thin sheet 280, and a color or a pattern is printed on an outer side of the thin sheet 280 so that a texture design may be realized. For this, a color printed layer (not shown) may be formed on the thin sheet 280, and the transparent member 290 such as thermoplastic polyurethane (TPU) may be formed on the color printed layer to prevent a scratch and to realize a sense of depth.

That is, a circuit forming unit 281 is formed at an inner side of the thin sheet 280, and at least one of the touch sensor 220, the wireless charging coil 281' and a light source (not shown) may be formed at the circuit forming unit 281.

As such, an electric circuit such as the touch sensor 220 may be implemented at the thin sheet 280, or an LED light source or a wireless charging coil may be implemented at the thin sheet 280.

By using the thin sheet 280 which is in the form of a PC foil, assembly processes may be simplified when the electronic device 200 is manufactured. Further, as internal components are formed at the thin sheet 280 and a region where the internal components are not formed is utilized as the band 202, an integrated design may be realized.

A circuit is implemented at the thin sheet 280, and then components such as the frame 210, the main circuit board 240 and the flexible printed circuit board 230 are disposed in the thin sheet 280, Accordingly, the electronic device 200 has a strength to be supported. As the frame 210, a PC material may be used, and the thin sheet 280 is insert-molded by using an elastic material such as TPU.

The present invention can be implemented as computer-readable codes in a program-recorded medium. The computer-readable medium may include all types of recording devices each storing data readable by a computer system.

Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the electronic device. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

INDUSTRIAL APPLICABILITY

The embodiment of the present invention is related to a watch-type electronic device, and may be applicable to an electronic device having a small window.

What is claimed is:

1. An electronic device, comprising:
 a body having a display unit;
 a frame provided at the body, and having an upper surface, a lower surface formed to face the upper surface, and side surfaces;
 a touch sensor formed at the frame; and
 a flexible printed circuit board (FPCB) connected to the touch sensor and provided at the lower surface of the frame,
 wherein the upper surface includes a planar part formed in parallel to the lower surface, and a curved part inclined from an end part of the planar part towards an end of the lower surface, and
 wherein the touch sensor is formed at the curved part so as to be spaced from the display unit, the display unit is mounted to the planar part, and the frame includes a laser direct structuring (LDS) material, and the touch sensor is formed as a metallic thin film,
 wherein the touch sensor includes a plurality of touch regions adjacent to each other, and the plurality of touch regions are electrically connected to the FPCB by conductive lines, and
 wherein the conductive lines are formed from a point on the curved part of the frame to a point on the lower surface of the frame.

2. The electronic device of claim 1, wherein bands are provided at both sides of the body, and the bands are coupled to each other by a magnetic force of a magnetic member provided at each of the bands.

3. The electronic device of claim 2, wherein at least one of a wireless charging coil or a light source is formed at the bands.

4. The electronic device of claim 1, wherein a screen displayed on the display unit is changed by touching or dragging at least part of the plurality of touch regions.

5. The electronic device of claim 1, wherein the metallic thin film is plated by a laser.

6. The electronic device of claim 1, wherein the display unit includes a display module, and a window formed to cover the display module,
 wherein a window region is formed at the front surface, and
 wherein a screen is displayed on one region of the window region by the display module, and a sensor or an indicator is provided at a remaining region of the window region.

7. The electronic device of claim 1, wherein the FPCB is attached to the lower surface of the frame, or is integrally formed with the frame.

8. A method of manufacturing an electronic device, the method comprising:
 manufacturing a frame by molding resin;
 irradiating a laser to the frame to form a pattern of a touch region to be plated, thereby applying a conductivity to the frame;
 applying metallic powder to the touch region by a laser, thereby performing a metal plating by a laser;
 forming a flexible printed circuit board (FPCB) at a lower surface of the frame; and
 positioning the frame within a metallic pattern such that the frame is covered, for an insert-molding process,
 wherein the resin includes a laser direct structuring (LDS) material,
 wherein the touch region is connected to the FPCB by a plurality of conductive lines, and the FPCB is connected to a main circuit board of the electronic device, and
 wherein the FPCB is attached to the lower surface of the frame, and the plurality of conductive lines are formed up to a point on the lower surface of the frame to thus be connected to the FPCB.

9. The method of claim 8, wherein the LDS material is a liquid crystal polymer (LCP).

10. The method of claim 8, wherein as a plurality of grooves or holes are formed at a surface of the frame, a molding material is accommodated in the grooves or holes at the time of the insert-molding process.

11. The method of claim 8, wherein the FPCB is integrally molded with the frame in the form of a thin film, at the time of the insert-molding process.

* * * * *